(12) United States Patent
Mehrabi et al.

(10) Patent No.: US 11,545,856 B2
(45) Date of Patent: **\*Jan. 3, 2023**

(54) WIRELESS POWER MODE SWITCHING

(71) Applicant: Apple Inc., Cupertino, CA (US)

(72) Inventors: Arash Mehrabi, Menlo Park, CA (US);
Gianpaolo Lisi, Santa Clara, CA (US);
Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/187,465

(22) Filed: Feb. 26, 2021

(65) Prior Publication Data

US 2022/0006327 A1    Jan. 6, 2022

Related U.S. Application Data

(63) Continuation of application No. 17/016,242, filed on Sep. 9, 2020, now Pat. No. 10,938,251.

(60) Provisional application No. 63/061,664, filed on Aug. 5, 2020, provisional application No. 63/047,797, filed on Jul. 2, 2020, provisional application No. 63/047,779, filed on Jul. 2, 2020.

(51) Int. Cl.
   *H02J 50/40* (2016.01)
   *H02J 7/04* (2006.01)
   *H02J 50/90* (2016.01)
   *H02J 50/12* (2016.01)

(52) U.S. Cl.
   CPC ............. *H02J 50/40* (2016.02); *H02J 7/04* (2013.01); *H02J 50/12* (2016.02); *H02J 50/90* (2016.02); *H02J 2207/20* (2020.01)

(58) Field of Classification Search
   CPC .................................................. H02J 50/50
   USPC ........................................................ 320/108
   See application file for complete search history.

(56) References Cited

U.S. PATENT DOCUMENTS

| | | |
|---|---|---|
| 9,762,082 B2 | 9/2017 | Park |
| 9,837,203 B2 | 12/2017 | Singh |
| 10,192,665 B2 | 1/2019 | Breiwa et al. |
| 10,199,877 B2 | 2/2019 | Van Den Brink et al. |
| 10,326,488 B2 | 6/2019 | Wojcik |
| 10,361,580 B2 | 7/2019 | Cha |
| 10,516,431 B2 | 12/2019 | DiLeila |

(Continued)

*Primary Examiner* — Edward Tso
*Assistant Examiner* — Ahmed H Omar
(74) *Attorney, Agent, or Firm* — Treyz Law Group, P.C.; Joseph F. Guihan

(57) ABSTRACT

A wireless power system may include an electronic device and a removable case. The electronic device and removable case may include wireless charging coils that are inductively coupled when the electronic device and the removable case are physically coupled. In a first mode, while the removable case is inductively coupled to the electronic device and the electronic device is not connected to a wired power source, a coil in the removable case transmits wireless power signals to the electronic device. In a second mode, while the removable case is inductively coupled to the electronic device and the electronic device is connected to a wired power source, the coil in the removable case receives wireless power signals from the electronic device. In a third mode, the removable case receives wireless power with a first coil and transmits wireless power to the electronic device with a second coil.

20 Claims, 8 Drawing Sheets

(56) References Cited

U.S. PATENT DOCUMENTS

| | | | |
|---|---|---|---|
| 2009/0212637 A1* | 8/2009 | Baarman | H01F 38/14 |
| | | | 307/104 |
| 2013/0026981 A1 | 1/2013 | Van Der Lee | |
| 2013/0260677 A1 | 10/2013 | Partovi | |
| 2014/0070624 A1 | 3/2014 | Kim et al. | |
| 2015/0364946 A1 | 12/2015 | Wang et al. | |
| 2016/0190861 A1 | 6/2016 | Cha | |
| 2016/0261133 A1 | 9/2016 | Wang | |
| 2016/0294225 A1 | 10/2016 | Blum et al. | |
| 2017/0373522 A1 | 12/2017 | Pelosi et al. | |
| 2018/0219986 A1 | 8/2018 | Lee et al. | |
| 2019/0025891 A1 | 1/2019 | Kim et al. | |
| 2019/0058360 A1 | 2/2019 | Garbus et al. | |
| 2020/0028376 A1 | 1/2020 | Ha et al. | |
| 2020/0028385 A1 | 1/2020 | Kim et al. | |
| 2020/0067340 A1 | 2/2020 | Batra et al. | |
| 2020/0119580 A1 | 4/2020 | Park et al. | |
| 2020/0119581 A1* | 4/2020 | Kim | H02J 7/0068 |
| 2020/0144837 A1* | 5/2020 | To | H02J 7/025 |
| 2020/0220367 A1* | 7/2020 | Cho | H02J 7/342 |
| 2020/0220387 A1 | 7/2020 | Zeine et al. | |

* cited by examiner

WIRELESS POWER MODE SWITCHING

This application is a continuation of U.S. non-provisional patent application No. 17/016,242, filed Sep. 9, 2020, which claims the benefit of provisional patent application No. 63/047,797, filed Jul. 2, 2020, provisional patent application No. 63/047,779, filed Jul. 2, 2020, and provisional patent application No. 63/061,664, filed Aug. 5, 2020, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The wireless power receiving device has a coil and rectifier circuitry. The coil receives alternating-current wireless power signals from the wireless charging mat. The rectifier circuitry converts the received signals into direct-current power.

SUMMARY

A wireless power system may include one or more wireless power transmitting devices, one or more wireless power receiving devices, and one or more wireless power transmitting and receiving devices. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power. The wireless power transmitting and receiving device may include at least one coil and both wireless power transmitting circuitry and wireless power receiving circuitry.

An electronic device (that is capable of both transmitting and receiving wireless power) may be physically and inductively coupled to a removable case (that is also capable of both transmitting and receiving wireless power). The removable case may have first and second wireless charging coils with a battery interposed between the first and second wireless charging coils. The electronic device and removable case may optionally be placed on a power transmitting device.

The removable case may be operable in a number of different modes. When the electronic device is not tethered to mains power using a power cable, the removable case may transmit wireless power signals to the electronic device using the first wireless charging coil. When the electronic device is tethered to mains power using a power cable, the removable case may receive wireless power signals from the electronic device using the first wireless charging coil. When the removable case is inductively coupled to both the power transmitting device and the electronic device, the second wireless charging coil may receive wireless power signals from the power transmitting device and the first wireless charging coil may transmit wireless power signals to the electronic device.

The electronic device may be operable in a transmitting mode and a receiving mode. When the electronic device is not connected to a wired power source, the electronic device may operate in the receiving mode. When the electronic device is connected to a wired power source, the electronic device may operate in the transmitting mode.

DETAILED DESCRIPTION

A wireless power system may include one or more electronic devices that transmit wireless power, one or more electronic devices that receive wireless power, and one or more electronic devices that both transmit and receive wireless power. The wireless power transmitting device may be a wireless charging mat or wireless charging puck, as examples. The wireless power receiving device may be a device such as a wrist watch, cellular telephone, tablet computer, laptop computer, or other electronic equipment, as examples. The wireless power transmitting and receiving device may be an electronic device case (e.g., a case for a cellular telephone) or other type of electronic device. The wireless power transmitting device may wirelessly transmit power to a wireless power receiving device. The wireless power receiving device uses power from the wireless power transmitting device for powering the device and for charging an internal battery.

Wireless power is transmitted from the wireless power transmitting device to the wireless power receiving device using one or more wireless power transmitting coils. The wireless power receiving device has one or more wireless power receiving coils coupled to rectifier circuitry that converts received wireless power signals into direct-current power.

In one illustrative configuration, an electronic device such as a cellular telephone may be configured to receive both wired and wireless power. The cellular telephone may include a coil that can either transmit or receive wireless power. The cellular telephone may also include a charging port that is configured to receive wired power from a charging cable that is connected to a wall outlet (e.g., mains power supply) through a power cable and a voltage converter such as an alternating current (AC) to Universal Serial Bus (USB) power adapter. The electronic device may be operable with a charging case that is also capable of both transmitting and receiving wireless power. In general, when the electronic device is inductively coupled to the charging case, the electronic device may receive wireless power from the charging case. When the electronic device receives wired power from the charging cable, the electronic device may transmit wireless power to the charging case.

Figure 1:
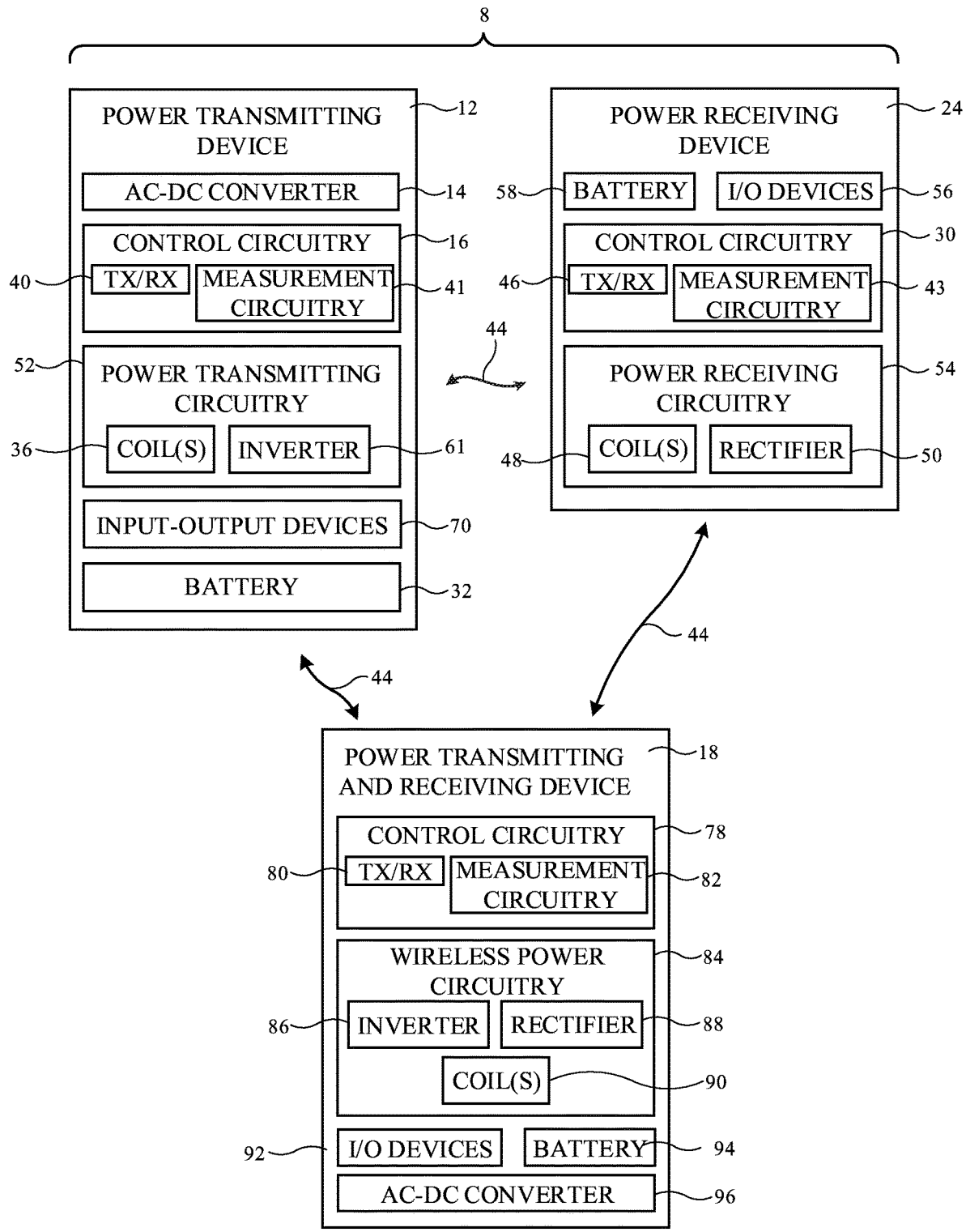
FIG. 1 is a schematic diagram of an illustrative wireless power system in accordance with an embodiment.

An illustrative wireless power system (wireless charging system) is shown in FIG. 1. As shown in FIG. 1, wireless power system 8 may include one or more wireless power transmitting devices such as wireless power transmitting device 12, one or more wireless power receiving devices such as wireless power receiving device 24, and one or more electronic devices capable of both transmitting and receiving wireless power (either simultaneously or at separate times) such as wireless power transmitting and receiving device 18. It should be understood that one or more of each type of device may be present in the wireless power system at any given time, with devices being added and removed from the system in a fluid manner. Additionally, one or more devices may switch between tethered (where the device receives power from a wall outlet or other power source) and untethered (where the device battery is used to power the device) states. The function of power transmitting and receiving device 18 may change depending upon the arrangement of the system at a given time. A power transmitting and receiving device may only transmit power in some scenarios, may only receive power in some scenarios, and may both transmit and receive power in some scenarios. A power transmitting device 12 may transmit power directly to a power receiving device 24 in some scenarios. In other scenarios, power transmitting device 12 may transmit power to a power transmitting and receiving device 18, which then transmits the power to power receiving device 24. The functionality of each device and inductive coupling between each device within the system may be updated as devices are added to and removed from the system.

Wireless power transmitting device 12 includes control circuitry 16. Wireless power receiving device 24 includes control circuitry 30. Wireless power transmitting and receiving device 18 includes control circuitry 78. Control circuitry in system 8 such as control circuitry 16, control circuitry 30, and control circuitry 78 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations between devices 12, 18, and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 16, 30, and/or 78. The software code may sometimes be referred to as software, data, program instructions, instructions, or code.

The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78.

The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is connected to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be connected to a wall outlet (e.g., an alternating current power source), may have a battery 32 for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. For simplicity, an example is described herein of power transmitting device 12 transmitting wireless power to power receiving device 24. However, it should be understood that a power transmitting and receiving device 18 may substitute for one or both of the power transmitting device and the power receiving device during wireless power transfer operations.

Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Coils 36 may be arranged in a planar coil array or may be arranged to form a cluster of coils. In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s)

48 in power receiving device 24. In other words, one or more of coils 36 is inductively coupled to one or more of coils 48. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display (screen) for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may optionally have one or more input-output devices 70 (e.g., input devices and/or output devices of the type described in connection with input-output devices 56). Device 18 may optionally have one or more input-output devices 92 (e.g., input devices and/or output devices of the type described in connection with input-output devices 56).

Device 12, device 18, and/or device 24 may communicate wirelessly using in-band or out-of-band communications. Device 12 may, for example, have wireless transceiver circuitry 40 that wirelessly transmits out-of-band signals (e.g., to device 18 or device 24) using an antenna. Wireless transceiver circuitry 40 may be used to wirelessly receive out-of-band signals from device 18 or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals. Wireless transceiver circuitry 40, 46, and 80 may also be used for in-band transmissions between devices 12, 24, and 18 using coils 36, 48, and 90.

Frequency-shift keying (FSK) and/or amplitude-shift keying (ASK) may be used to convey in-band data between devices 12, 18, and 24. Power may be conveyed wirelessly during these FSK and ASK transmissions.

It is desirable for power transmitting device 12, power transmitting and receiving device 18, and power receiving device 24 to be able to communicate information such as received power, battery states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24 (e.g., so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry can also be used to make sensor measurements using a capacitive sensor, can be used to make temperature measurements, and/or can otherwise be used in gathering information indicative of whether a foreign object or other external object (e.g., device 18 or 24) is present on device 12.

In some configurations, the control circuitry of device 12 (e.g., circuitry 41 and/or other control circuitry 16) can implement a power counting foreign object detection scheme. With this approach, device 12 receives information from device 24 (e.g., via in-band communications) indicating the amount of power that device 24 is wirelessly receiving (e.g., 4.5 W). Device 12 knows how much power (e.g., 5.0 W) is being transmitted (e.g., because device 12 knows the magnitude of the signal being used to drive coil 36 from inverter 61). By comparing the transmitted power (e.g., 5.0 W) to the received power (e.g., 4.5 W), device 12 can determine whether wireless power is being dissipated due to eddy currents flowing in a foreign object. If the dissipated power (e.g., 0.5 W in this example) is more than a predetermined threshold amount or if the efficiency of the wireless power transfer process is lower than expected, device 12 can conclude that a foreign object is present. Power counting techniques such as these may be used in conjunction with capacitive sensing foreign object detection techniques and/or other external object measurement operations performed using circuitry 41.

In some embodiments, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 may also include circuits (e.g., analog-to-digital converter circuits, filters, analog combiners, digital processing circuitry, etc.) to measure the response of system 8.

Power transmitting and receiving device 18 may be a wireless charging mat or puck that is connected to a power adapter (e.g., an AC to USB power adapter) or other equipment by a cable, may be equipment that has been incorporated into furniture, a vehicle, or other system, may be a removable battery case, may be a portable electronic device such as a wrist watch, a cellular telephone, a laptop computer, a tablet computer, an accessory such as an earbud, or other electronic equipment. Power transmitting and receiving device 18 is capable of both transmitting and receiving wireless power. Power transmitting and receiving device 18 therefore may include power transmitting components, similar to power transmitting device 12. Power transmitting and receiving device 18 may also include power receiving components, similar to power receiving device 24.

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and out-of-band communications (using an antenna). Control circuitry 78 may also optionally include measurement circuitry 82 (e.g., measurement circuitry of the type described in connection with measurement circuitry 41).

Wireless power circuitry 84 in device 18 may include both an inverter 86 and a rectifier 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

The depiction of alternating-electromagnetic fields between each type of device in FIG. 1 is merely illustrative (to show the type of inductive coupling that is possible). In practice, alternating-electromagnetic fields will only be conveyed between select devices within the system. For example, transmitting device 12 may transmit power to device 24 and device 18 (while device 18 does not separately transmit power to device 18). In another example, transmitting device 12 transmits power to device 18, which transmits power to 24 (without direct exchange of power from device 12 to device 24).

In some applications, power transmitting and receiving device 18 only transmits wireless power (e.g., using inverter 86 and coil(s) 90). In some applications, power transmitting and receiving device 18 only receives wireless power (e.g., using rectifier 88 and coil(s) 90). In some applications, power transmitting and receiving device simultaneously receives and transmits wireless power. When simultaneously receiving and transmitting wireless power, device 18 may optionally perform both the power transmitting and power receiving operations associated with inverter 86 and rectifier 88 (e.g., device 18 uses the rectifier to charge the battery and operate the device and independently uses the inverter to transmit a desired amount of power). Alternatively, device 18 may relay received wireless power signals without rectifying the power. Device 18 may include only one coil that is used for both wireless power transmission and wireless power reception. Alternatively, device 18 may have at least one dedicated wireless power transmitting coil and at least one dedicated wireless power receiving coil. Device 18 may have multiple coils that are all used for both wireless power transmission and wireless power reception. Different coils in device 18 may optionally be shorted together in different modes of operation.

Figure 2:
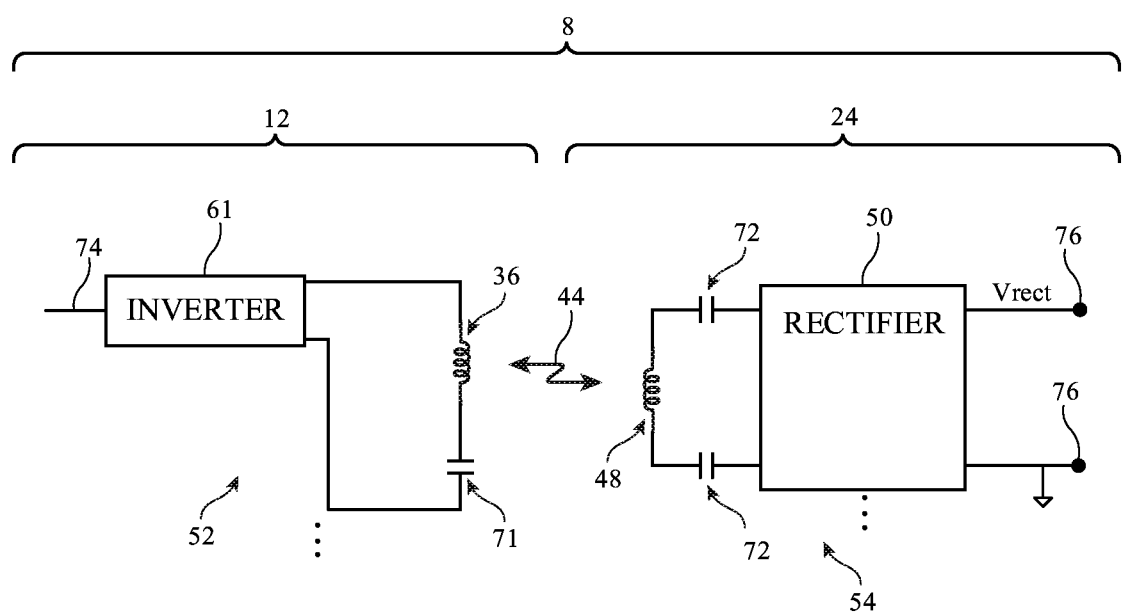
FIG. 2 is a circuit diagram of illustrative wireless power transmitting and receiving circuitry in accordance with an embodiment.

FIG. 2 is a circuit diagram of illustrative wireless charging circuitry for system 8. Wireless charging circuitry of a power transmitting device 12 and a power receiving device 24 is shown. However, it should be understood that device 18 may have the corresponding components for both power transmission and power reception and may be used in place of either device 12 and/or device 24 if desired. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. In general, wireless power may simultaneously be conveyed between devices during in-band communications (using ASK or FSK).

The power transmission frequency used for transmission of wireless power may be, for example, a predetermined frequency of about 125 kHz, at least 80 kHz, at least 100 kHz, between 100 kHz and 205 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90) may be considered in-band signals.

Moreover, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals at the power transmission frequency. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power (e.g., even if the devices do not enter a dedicated power transfer phase).

The aforementioned FSK and ASK modulation and demodulation techniques may be used to transmit data packets between any two devices within system 8. Each data packet may include numerous data bits (sometimes referred to as bits). The data bits may be grouped into bytes, with each byte including any desired number of bits (e.g., 8 bits).

At least one coil in power transmitting and receiving device 18 may be used for transmitting or receiving wireless power (depending on the conditions within the wireless charging system). However, the coil does not transmit and receive wireless power at the same time. Therefore, control circuitry within the device may be used to control whether the coil is used for transmitting or receiving wireless power at any given time.

Figure 3:
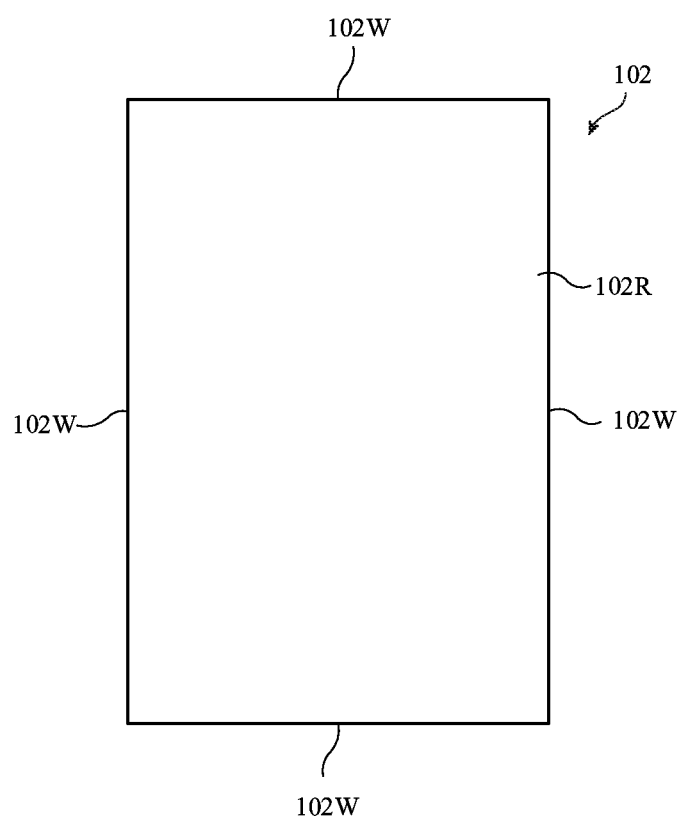
FIG. 3 is a top view of an illustrative removable accessory that may be included in a wireless power system in accordance with an embodiment.

A device in wireless charging system 8 may optionally be coupled (e.g., physically coupled) to a removable accessory such as a case. The case may optionally have wireless charging functionality (e.g., the case may be capable of receiving and/or transmitting wireless power). When the device is physically coupled to the removable accessory and the removable accessory has wireless charging functionality, the device and the removable accessory may also be inductively coupled. FIG. 3 is a top view of an accessory such as a removable case.

Removable accessory 102 (sometimes referred to as a removable case or removable cover) may have any suitable shape that allows case 102 to mate with another device. Accessory 102 and the device to which it is coupled may each serve as a power transmitting device, a power receiving device, or a power transmitting and receiving device. The device held by accessory 102 may be a portable electronic device such as a wrist watch, a cellular telephone, a laptop computer, a tablet computer, an accessory such as an earbud, or other electronic equipment.

In the example of FIG. 3, case 102 includes a rectangular recess with a wall 102R surrounded by peripheral sidewalls 102W and/or other suitable coupling structures (straps, clips, a sleeve, corner pockets, etc.) that allow cover 102 to receive and couple to the additional device. Wall 102R may be positioned adjacent a rear face of the device when coupled to the device and therefore may sometimes be referred to as rear wall 102R. When it is desired to protect the additional device in case 102, the device (e.g., a housing of the device) may be press fit into a recess formed by the sidewalls 102W and/or rear wall 102R of cover 102, coupled to cover 102 using magnets, clips, or straps, or otherwise coupled to cover 102. Cover 102 may be formed from fabric, leather, polymer, other materials, and/or combinations of these materials. As previously mentioned, cover 102 may in some embodiments include one or more coils that each transmit and/or receives wireless power.

Figure 4:
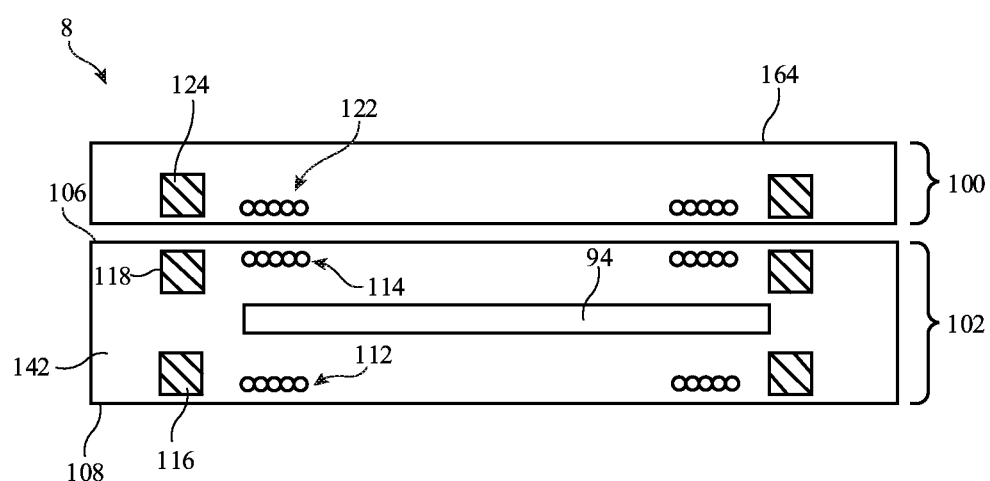
FIG. 4 is a cross-sectional side view of an illustrative wireless power system including an untethered device inductively coupled to a removable accessory in accordance with an embodiment.

FIG. 4 is a cross-sectional side view showing device 100 inductively coupled to removable case 102. Device 100 and removable case 102 in FIG. 4 are also physically coupled (e.g., the removable case receives device 100). Device 100 may have a housing 164. Housing 164 may be formed of plastic, glass, ceramics, fiber composites, metal (e.g., stainless steel, aluminum, etc.), other suitable materials, or a combination of any two or more of these materials. Case 102 may have a recess that conforms to the shape of housing 164. In one illustrative example, device 100 is a power transmitting and receiving device (e.g., device 18 in FIG. 1). In general, device 100 may be a removable battery case, a portable electronic device such as a wrist watch, a cellular telephone, a laptop computer, a tablet computer, an accessory such as an earbud, or other electronic equipment. Herein, an example will be described where device 100 is a portable electronic device such as a cellular telephone that is capable of both transmitting and receiving wireless power.

Removable case 102 may include one or more dielectric layers 142 (e.g., a bulk dielectric material) such as one or more layers of fabric, leather, polymer (e.g., polyurethane), other materials, and/or combinations of these materials. One or more coils may be embedded in the one or more layers of dielectric material.

As shown in FIG. 4, removable case 102 may include a first coil 112 and a second coil 114. As shown, coil 114 may be adjacent to a first surface 106 of removable case 102 whereas coil 112 may be adjacent to a second surface 108 of removable case 102. The removable case may be configured such that surface 106 is positioned adjacent to device 100 when removable case 102 is physically coupled to device 100. Consequently, coil 114 may be positioned adjacent to device 100 when removable case 102 is physically (and inductively) coupled to device 100. Coil 114 is interposed between device 100 and coil 112 when removable case 102 is physically (and inductively) coupled to device 100. Battery 94 may be interposed between coils 112 and 114, as shown in FIG. 4.

Accordingly, coil 114 may be used to transmit wireless power to device 100. Device 100 may include a coil 122 that is configured to receive wireless power signals from coil 114.

Coils 112, 114, and 122 may be capable of transmitting or receiving wireless power signals. When coil 114 is used to transmit wireless power to coil 122, inverter circuitry (e.g., inverter 86 in FIG. 1) can drive the coil 114 to generate magnetic flux. Coil 122 in device 100 may be coupled to rectifier circuitry (e.g., rectifier 88 in FIG. 1). The rectifier circuitry converts received AC signals from coil 122 into DC voltage signals for powering device 100 and/or charging a battery in device 100.

When devices 100 and 102 are inductively coupled in the absence of an additional device, coil 112 in removable case 102 may be on standby. When coil 112 is on standby (e.g., in a standby mode or standby state), the coil does not continuously transmit or receive wireless power signals. In other words, the standby mode occurs when the coil has not entered a dedicated power transfer phase. While coil 112 is in the standby mode, device 102 may intermittently check for the presence of another device (e.g., using coil 112 or another sensor in the device) adjacent to surface 108. For example, coil 112 may intermittently transmit low power pings while on standby in order to monitor for another device being added to the system. Alternatively or in addition, a magnetic sensor (e.g., a Hall effect sensor), another type of sensor, a near-field communication (NFC) antenna, or another desired component may be used to detect another device adjacent to surface 108 of device 102. The coil 112 may additionally be prepared to send a transmission (e.g., an ASK transmission) while on standby. If coil 112 receives a digital ping from another device in the system, the coil may immediately respond with the transmission.

Figure 5:
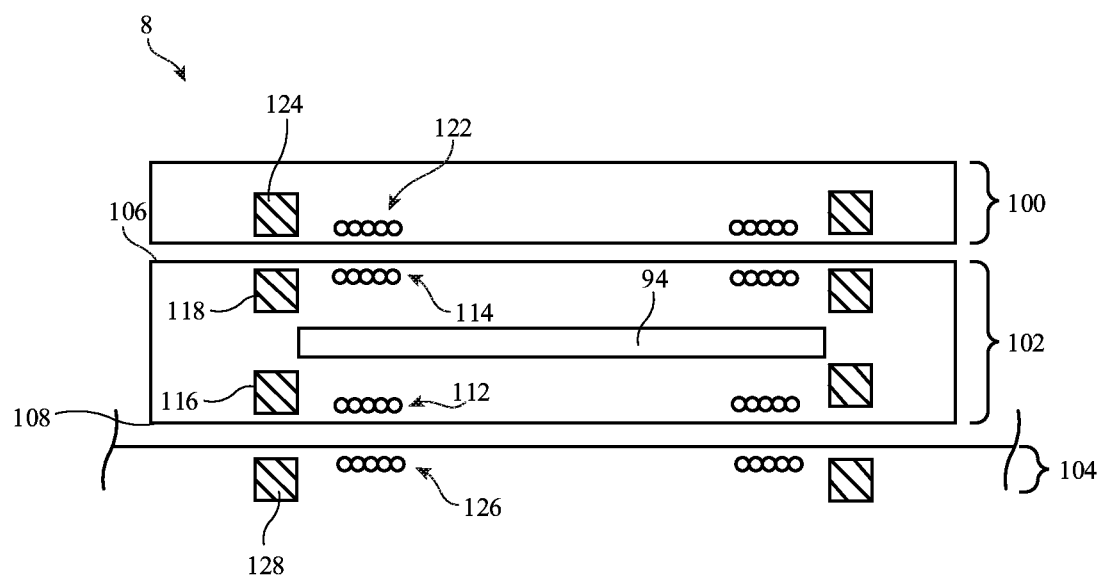
FIG. 5 is a cross-sectional side view of an illustrative wireless power system including an untethered device inductively coupled to a removable accessory that is inductively coupled to a power transmitting device in accordance with an embodiment.

In some situations device 100 and accessory 102 may be physically coupled together and may be placed on a power transmitting device. A situation of this type is shown in FIG. 5. In this scenario, power transmitting device 104 may transmit wireless power to device 102. At the same time, device 102 may transmit wireless power to device 100.

Similar to as discussed in connection with FIG. 1, the power transmitting device 104 in FIG. 5 may be a wireless charging mat, wireless charging puck, a battery case (e.g., a dedicated wireless power transmitting device), or another electronic device (e.g., a wireless power transmitting and receiving device). An example is described herein where the power transmitting device 104 is a wireless charging mat. The wireless charging mat 104 may be connected to a wall outlet (e.g., an alternating current power source). Using power from this power source, the wireless charging mat 104 may transmit wireless power to one or more devices.

In FIG. 5, coil 126 in power transmitting device 104 may transmit wireless power signals to coil 112 in accessory 102. Inverter circuitry may drive the coil 126 to generate magnetic flux. Coil 112 in device 102 may be coupled to rectifier circuitry (e.g., rectifier 88 in FIG. 1). The rectifier circuitry converts received AC signals from coil 112 into DC voltage signals for powering device 102 and/or charging a battery in device 102. Using power from the battery or directly from the rectifier, inverter circuitry (e.g., inverter 86 in FIG. 1) may drive the coil 114 to generate magnetic flux that is transferred to coil 122 in device 100. In another possible arrangement, AC power from the rectifier circuitry may be directly relayed to the inverter circuitry that drives 114 (instead of rectifying to DC then inverting back to AC). Coil 122 in device 100 may be coupled to rectifier circuitry (e.g., rectifier 88 in FIG. 1). The rectifier circuitry converts received AC signals from coil 122 into DC voltage signals for powering device 100 and/or charging a battery in device 100.

Coils 112, 114, 122, and 126 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

Devices 100, 102, and 104 may also optionally include magnetic alignment structures. As shown in FIGS. 4 and 5, device 100 includes a magnetic alignment structure 124. Device 102 includes a first magnetic alignment structure 118 and a second magnetic alignment structure 116. Device 104 includes a magnetic alignment structure 128. Each magnetic alignment structure in the system may magnetically couple with a corresponding magnetic alignment structure in the system. For example, alignment structure 128 in transmitting device 104 may magnetically couple with alignment structure 116 in removable accessory 102. When the alignment structure 128 in device 104 is coupled to the alignment structure 116 in device 102, the coil 126 may be aligned with the coil 112. Therefore, the magnetic alignment structures ensure proper alignment of the receiving coil (112) relative to the transmitting coil (126).

Alignment structure 118 in removable accessory 102 may magnetically couple with alignment structure 124 in device 100. When the alignment structure 118 in device 102 is coupled to the alignment structure 124 in device 100, the coil 114 may be aligned with the coil 122. Therefore, the magnetic alignment structures ensure proper alignment of the receiving coil (122) relative to the transmitting coil (114).

Magnetic alignment structures 128, 116, 118, and 124 may be permanent magnets (e.g., formed from hard magnetic materials that retain their magnetism over time). The magnetic alignment structures may laterally surround a respective coil. The alignment structures may sometimes be described as annular or circular. Magnetic alignment structure 128 may have a central opening with coil 126 formed in the central opening. Alignment structure 128 and coil 126 may be concentric. This example is merely illustrative. Other arrangements may be used if desired. For example, alignment structure 128 may be formed as two discrete permanent magnets on opposing sides of coil 126. In another example, a plurality of discrete permanent magnets may be arranged in a circular (annular) pattern (e.g., dotted lines forming a circle) around coil 126. The discrete permanent magnets may have an arcuate arrangement. The aforementioned magnetic alignment structure and coil arrangements described relative to alignment structure 128 and coil 126 may apply to any of the sets of alignment structures and coils (e.g., alignment structure 116 and coil 112, alignment structure 118 and coil 114, and alignment structure 124 and coil 122).

Each coil (e.g., coils 112, 114, 122, and 126) may optionally have a corresponding magnetic core of any desired design. In one possible arrangement, a magnetic core may be included with a pot-core design (e.g., an enclosure with a ring-shaped hollow portion that receives the coil). In yet another possible arrangement, a winding on a bar-shaped ferrite may be used. Any desired magnetic core and coil design may be used (e.g., a U-shaped core, a C-shaped core, an E-shaped core, a toroidal core, etc.). Each coil may have any desired number of windings. The precise geometry of the coils and magnetic cores in devices 100, 102, and 104 may be tailored to the specific design. Device 100 may be designed to cooperate specifically with wireless power transmitting device 104. This is, however, merely illustrative. Device 100 may, in comes cases, not be specifically designed to cooperate with power transmitting device 104. In general, each device may have different coil arrangements, different (or no) magnetic elements (e.g., magnetic cores), different coil and magnetic element sizes, different coil and magnetic element shapes, and other different characteristics.

In both FIGS. 4 and 5, coil 114 in device 102 transmits wireless power to coil 122 in device 100. This is the case regardless of whether accessory 102 and device 100 are in the presence of charging mat 104 (as in FIG. 5) or not (as in FIG. 4). Removable accessory 102 transmitting wireless power to device 100 may be the default configuration for removable accessory 102 and device 100 in the absence of a wired power source connected to device 100. In FIGS. 4 and 5, device 100 is not connected to a wired power source (e.g., device 100 is untethered). Therefore, device 100 receives power from removable accessory 102. However, if device 100 is connected to a wired power source (e.g., device 100 is tethered), device 100 may instead transmit power to removable accessory 102. An arrangement of this type is shown in FIG. 6.

Figure 6:
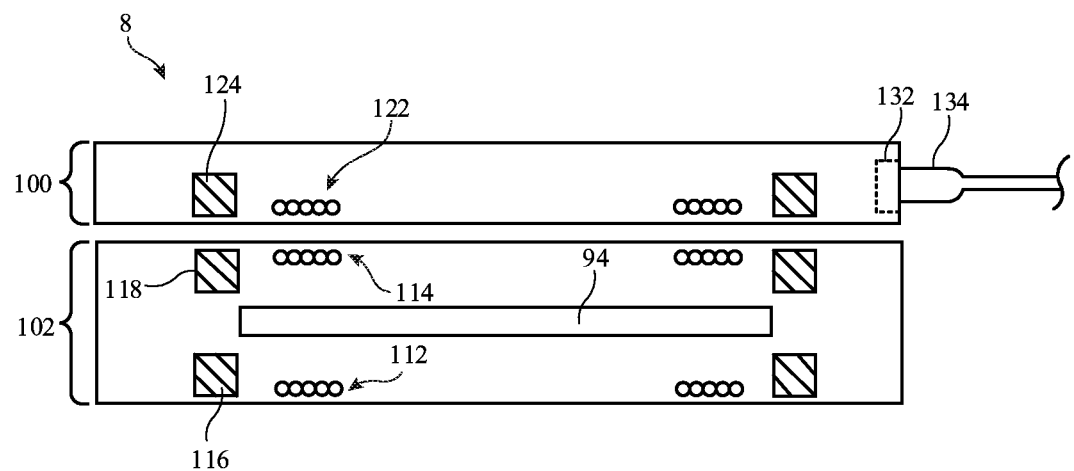
FIG. 6 is a cross-sectional side view of an illustrative wireless power system including a tethered device inductively coupled to a removable accessory in accordance with an embodiment.

As shown in FIG. 6, device 100 may include a charging port 132. The charging port may be an opening in the device housing that is configured to connect to a wired power source such as cable 134. Cable 134 may have a connector that is inserted into the charging port 132 to connect device 100 to wired power. The cable 134 may be connected to a wall outlet (e.g., mains power supply) through a voltage converter such as an AC to USB power adapter.

When device 100 is connected to a wired power source as in FIG. 6 (e.g., when device 100 is tethered to a USB or Lightning power source), the device may switch from a receiving mode in which coil 122 receives wireless power to a transmitting mode in which coil 122 transmit wireless power. In the transmitting mode, inverter circuitry may drive the coil 122 to generate magnetic flux. Coil 114 in device 102 may be coupled to rectifier circuitry (e.g., rectifier 88 in FIG. 1). The rectifier circuitry converts received AC signals from coil 114 into DC voltage signals for powering device 102 and/or charging a battery in device 102. When devices 100 and 102 are inductively coupled while device 100 is connected to wired power, coil 114 in removable case 102 may receive wireless power and coil 112 in removable case 102 may be on standby.

Figure 7:
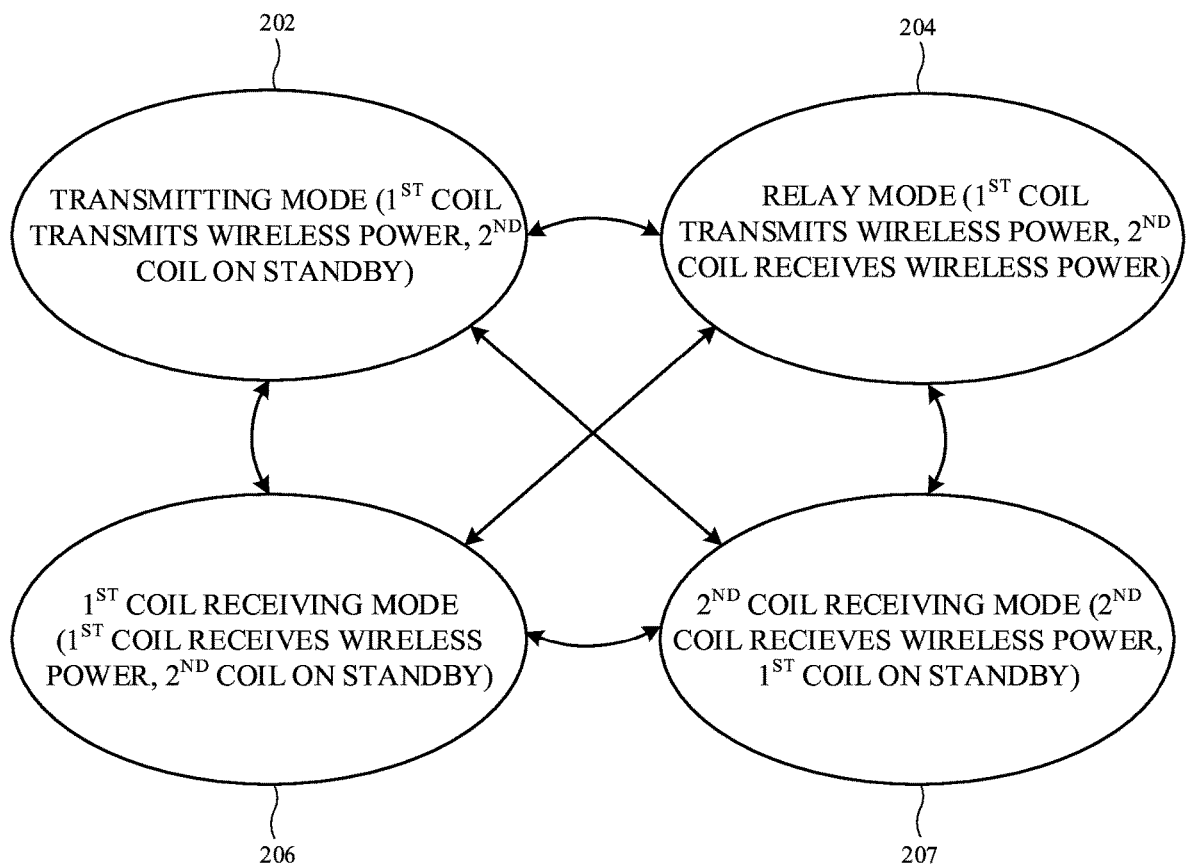
FIG. 7 is a state diagram of illustrative modes of operation for a removable accessory in a wireless power system in accordance with an embodiment.

FIG. 7 is a state diagram showing illustrative modes of operation for the removable accessory 102 in system 8. Removable accessory 102 may be operable in a transmitting mode 202 in which coil 114 transmits wireless power to device 100. In the transmitting mode, the second coil (112) may be on standby. In the transmitting mode, inverter circuitry 86 (e.g., formed from transistors) coupled to coil 114 may be turned on and off based on control signals provided by control circuitry 78 to create AC current signals through coil 114. These coil drive signals cause coil 114 to transmit wireless power to coil 122 in device 100.

Removable accessory 102 may operate in the transmitting mode while the removable accessory is inductively coupled to device 100, device 100 is not connected to a wired power source (e.g., while device 100 is untethered), and the removable accessory is not placed on an additional power transmitting device (e.g., not inductively coupled to an additional power transmitting device).

Removable accessory 102 may be operable in a relay mode 204 in which coil 112 receives wireless power from power transmitting device 104 and coil 114 transmits wireless power to device 100. In the relay mode, rectifier circuitry converts received AC signals from coil 112 into DC voltage signals for powering device 102 and/or charging a battery in device 102. Using power from the battery or directly from the rectifier circuitry, inverter circuitry 86 (e.g., formed from transistors) coupled to coil 114 may be turned on and off based on control signals provided by control circuitry 78 to create AC current signals through coil 114. These coil drive signals cause coil 114 to transmit wireless power to coil 122 in device 100.

Removable accessory 102 may operate in the relay mode while inductively coupled to device 100 and transmitting device 104.

Removable accessory 102 may also be operable in a first coil receiving mode 206 in which coil 114 receives wireless power from coil 122 in device 100. In the first coil receiving mode, the second coil (112) may be on standby. In the first coil receiving mode, rectifier circuitry converts received AC signals from coil 114 into DC voltage signals for powering device 102 and/or charging a battery in device 102. In the first coil receiving mode (while the second coil 112 is on standby), device 102 may intermittently use coil 112 or another component such as a magnetic sensor or NFC antenna to check for the presence of an additional device (such as device 104 in FIG. 5) adjacent to surface 108 and coil 112.

Removable accessory 102 may operate in the first coil receiving mode while the removable accessory is inductively coupled to device 100, device 100 is connected to a wired power source (e.g., while device 100 is tethered), and the removable accessory is not placed on an additional power transmitting device.

It should be noted that there are some additional circumstances in which removable accessory 102 may operate in the first coil receiving mode. In general, if the removable accessory is inductively coupled to device 100 while device 100 is untethered, removable accessory may default to the transmitting mode (or relay mode if the transmitter 104 is present). However, if the state of charge of the removable accessory is very low and the state of charge of device 100 is very high, removable accessory 102 may operate in the first coil receiving mode. Devices 100 and 102 may exchange state of charge information and switch removable accessory 102 into the first coil receiving mode if appropriate. As another example, a user may manually switch removable accessory 102 into the first coil receiving mode while removable accessory 102 is inductively coupled to device 100.

Removable accessory 102 may also be operable in a second coil receiving mode 207 in which coil 112 receives wireless power (e.g., from coil 126 in device 104 or other power transmitting coil). In the second coil receiving mode, the first coil (114) may be on standby. In the second coil receiving mode, rectifier circuitry converts received AC signals from coil 112 into DC voltage signals for powering device 102 and/or charging a battery in device 102.

While coil 114 is in the standby mode, device 102 may intermittently check for the presence of another device (e.g., using coil 114 or another sensor in the device) adjacent to surface 106. For example, coil 114 may intermittently transmit low power pings while on standby in order to monitor for another device being added to the system. Alternatively or in addition, a magnetic sensor (e.g., a Hall effect sensor), another type of sensor, a near-field communication (NFC) antenna, or another desired component may be used to detect another device adjacent to surface 106 of device 102. The coil 114 may additionally be prepared to send a transmission (e.g., an ASK transmission) while on standby. If coil 114 receives a digital ping from another device in the system, the coil may immediately respond with the transmission.

Removable accessory 102 may operate in the second coil receiving mode while the removable accessory is inductively coupled to device 104 and the removable accessory is not inductively coupled to another device (100).

It should be noted that the example of removable accessory 102 including first and second coils is merely illustrative. In some cases, removable accessory 102 may only include one coil. For example, coil 112 may be omitted and coil 114 (capable of transmitting or receiving wireless power) may still be included.

Figure 8:
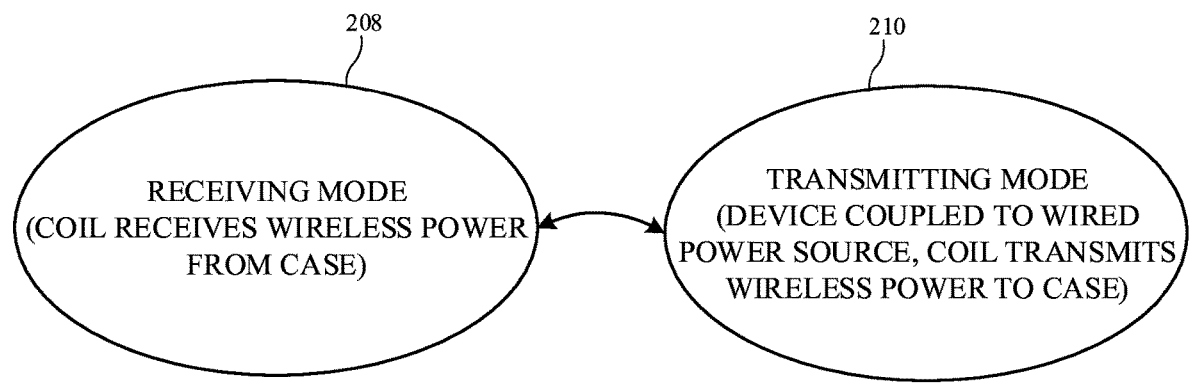
FIG. 8 is a state diagram of illustrative modes of operation for an electronic device in a wireless power system in accordance with an embodiment.

FIG. 8 is a state diagram showing illustrative modes of operation for device 100 in system 8. Device 100 may be operable in a receiving mode 208 in which coil 122 receives wireless power (e.g., from coil 114 in removable accessory 102). The rectifier circuitry converts received AC signals from coil 122 into DC voltage signals for powering device 100 and/or charging a battery in device 100.

Device 100 may operate in the receiving mode while device 100 is inductively coupled to device 102 and device 100 is not connected to a wired power source (e.g., device 100 is untethered). Device 100 may also operate in the receiving mode while device 100 is inductively coupled to device 104 without an intervening device (102).

Device 100 may also be operable in a transmitting mode 210 in which coil 122 transmits wireless power to device 102. In the transmitting mode, inverter circuitry 86 (e.g., formed from transistors) coupled to coil 122 may be turned on and off based on control signals provided by control circuitry 78 to create AC current signals through coil 122. These coil drive signals cause coil 122 to transmit wireless power to coil 114 in device 102.

Device 100 may operate in the transmitting mode while device 100 is inductively coupled to removable accessory 102 and while device 100 is tethered to mains power through a power cable and a voltage converter such as an AC to USB adapter.

Similar to as previously mentioned, there are some additional circumstances in which device 100 may operate in the transmitting mode. In general, if the removable accessory 102 is inductively coupled to device 100 while device 100 is untethered, device 100 may default to the receiving mode 208. However, if the state of charge of the removable accessory 102 is very low and the state of charge of device 100 is very high, device 100 may operate in the transmitting mode 210. Devices 100 and 102 may exchange state of charge information and switch device 100 into the transmitting mode (and device 102 into its receiving mode) if appropriate. As another example, a user may manually switch device 100 into the transmitting mode while device is inductively coupled to removable accessory 102.

Device 100 may therefore default to the receiving mode when coupled with removable accessory 102. However, in response to being connected to wired power (e.g., at charging port 132), device 100 may switch to a transmitting mode and transmit wireless power to the removable accessory. In other words, being connected to wired power causes device 100 to switch from the receiving mode 208 to the transmitting mode 210 (and causes a corresponding mode switch in accessory 102). If the device 100 is then subsequently disconnected from the wired power source (e.g., untethered), device 100 may switch back to the receiving mode. In other words, being disconnected from wired power causes device 100 to switch from the transmitting mode 210 to the receiving mode 208 (and causes a corresponding mode switch in accessory 102).

The foregoing is merely illustrative and various modifications can be made to the described embodiments. The foregoing embodiments may be implemented individually or in any combination.

What is claimed is:

1. An accessory for an electronic device, comprising:
a wireless charging coil; and
control circuitry configured to:
in a first mode, while the accessory is inductively coupled to the electronic device and the electronic device is not connected to a wired power source, transmit wireless power signals to the electronic device using the wireless charging coil; and
in a second mode, while the accessory is inductively coupled to the electronic device and while the electronic device is connected to a wired power source, receive wireless power signals from the electronic device using the wireless charging coil.

2. The accessory of claim 1, further comprising a battery coupled to the control circuitry, wherein the control circuitry is further configured to charge the battery with power received wirelessly using the wireless charging coil.

3. The accessory of claim 2, wherein the accessory has first and second opposing planar surfaces and wherein the wireless charging coil is positioned adjacent the first planar surface.

4. The accessory of claim 3, further comprising:
at least one dielectric layer that forms the first and second planar surfaces, wherein the battery and the wireless charging coil are disposed in the at least one dielectric layer.

5. The accessory of claim 2, wherein the wireless charging coil is interposed between the battery and the electronic device when the accessory is inductively coupled to the electronic device.

6. The accessory of claim 1, wherein the accessory is a case having a wall and peripheral sidewalls that define a recess configured to receive the electronic device.

7. The accessory of claim 6, wherein the wireless charging coil is disposed in the wall.

8. The accessory of claim 1, further comprising:
a magnetic alignment structure that is configured to magnetically couple to an additional magnetic alignment structure in the electronic device.

9. The accessory of claim 8, wherein the wireless charging coil is aligned with an additional wireless charging coil of the electronic device when the magnetic alignment structure is magnetically coupled to the additional magnetic alignment structure.

10. The accessory of claim 8, wherein the magnetic alignment structure and the wireless charging coil are concentric.

11. The accessory of claim 1, further comprising:
at least one dielectric layer that forms a planar surface, wherein the planar surface is configured to abut a rear face of the electronic device while the accessory is inductively coupled to the electronic device.

12. A method of operating an accessory for an electronic device, wherein the accessory comprises a wireless charging coil, the method comprising:
in a first mode, while the accessory is inductively coupled to the electronic device and the electronic device is not connected to a wired power source, transmitting wireless power signals to the electronic device using the wireless charging coil; and
in a second mode, while the accessory is inductively coupled to the electronic device and while the electronic device is connected to a wired power source, receiving wireless power signals from the electronic device using the wireless charging coil.

13. The method of claim 12, wherein the accessory further comprises a battery and wherein the method further comprises:
charging the battery with power received wirelessly using the wireless charging coil.

14. The method of claim 13, wherein the wireless charging coil is interposed between the battery and the electronic device when the accessory is inductively coupled to the electronic device.

15. The method of claim 12, wherein the accessory is a case having a wall and peripheral sidewalls that define a recess configured to receive the electronic device and wherein the wireless charging coil is disposed in the wall.

16. The method of claim 12, wherein the accessory further comprises at least one dielectric layer that forms a planar surface and wherein the planar surface is configured to abut a rear face of the electronic device while the accessory is inductively coupled to the electronic device.

17. A non-transitory computer-readable storage medium storing one or more programs configured to be executed by one or more processors of an accessory for an electronic device, wherein the accessory comprises a wireless charging coil, the one or more programs including instructions for:

- in a first mode, while the accessory is inductively coupled to the electronic device and the electronic device is not connected to a wired power source, transmitting wireless power signals to the electronic device using the wireless charging coil; and
- in a second mode, while the accessory is inductively coupled to the electronic device and while the electronic device is connected to a wired power source, receiving wireless power signals from the electronic device using the wireless charging coil.

18. The non-transitory computer-readable storage medium of claim 17, wherein the accessory further comprises a battery and wherein the method further comprises:
charging the battery with power received wirelessly using the wireless charging coil, wherein the wireless charging coil is interposed between the battery and the electronic device when the accessory is inductively coupled to the electronic device.

19. The non-transitory computer-readable storage medium of claim 17, wherein the accessory is a case having a wall and peripheral sidewalls that define a recess configured to receive the electronic device and wherein the wireless charging coil is disposed in the wall.

20. The non-transitory computer-readable storage medium of claim 17, wherein the accessory further comprises at least one dielectric layer that forms a planar surface and wherein the planar surface is configured to abut a rear face of the electronic device while the accessory is inductively coupled to the electronic device.

* * * * *